United States Patent
Nakajima

(10) Patent No.: US 9,994,071 B2
(45) Date of Patent: Jun. 12, 2018

(54) BICYCLE WHEEL SECURING STRUCTURE

(71) Applicant: Shimano Inc., Sakai, Osaka (JP)

(72) Inventor: Jun Nakajima, Osaka (JP)

(73) Assignee: Shimano Inc., Osaka (JP)

( * ) Notice: Subject to any disclaimer, the term of this patent is extended or adjusted under 35 U.S.C. 154(b) by 135 days.

(21) Appl. No.: 15/203,050

(22) Filed: Jul. 6, 2016

(65) Prior Publication Data
US 2017/0036729 A1 Feb. 9, 2017

(30) Foreign Application Priority Data

Aug. 5, 2015 (JP) .................. 2015-155220

(51) Int. Cl.
*B62K 25/02* (2006.01)
*B60B 27/02* (2006.01)

(52) U.S. Cl.
CPC ............ *B60B 27/026* (2013.01); *B62K 25/02* (2013.01); *B62K 2025/025* (2013.01)

(58) Field of Classification Search
CPC .............. B62K 25/02; B62K 2025/025; B62K 2206/00; B60B 27/02
USPC .................. 301/110.5, 124.1, 124.2
See application file for complete search history.

(56) References Cited

U.S. PATENT DOCUMENTS

| | | | | |
|---|---|---|---|---|
| 7,537,291 B2* | 5/2009 | Hara | ..................... | B60B 27/026 301/110.5 |
| 7,628,416 B2* | 12/2009 | Hara | ..................... | B62K 25/02 280/260 |
| 7,722,129 B2* | 5/2010 | Cusack | ................. | B62K 25/02 301/110.5 |
| 7,753,454 B2* | 7/2010 | Hara | ..................... | B60B 27/026 301/110.5 |
| 8,186,768 B2* | 5/2012 | Spahr | ..................... | B62K 25/02 301/110.5 |
| 8,777,330 B2* | 7/2014 | Lim | ....................... | B62K 25/02 301/124.2 |
| 9,259,966 B2* | 2/2016 | Lin | ....................... | B60B 27/026 |

* cited by examiner

*Primary Examiner* — Samuel J Morano, IV
*Assistant Examiner* — Jean W Charleston
(74) *Attorney, Agent, or Firm* — Global IP Counselors, LLP

(57) ABSTRACT

A bicycle wheel securing structure is basically provided with an axle member, a head member, a lever member and an adjusting member. The axle member is at least partially hollow, and includes a first end portion, a second end portion and a vehicle body engagement portion. The vehicle body engagement portion is provided to the second end portion for engaging a bicycle frame. The head member is disposed on the first end portion. The lever member is configured to turn the head member around an axis between a first position and a second position. The lever member presses the head member from the first end portion to the second end portion by being turned from the second position to the first position. The adjusting member is provided inside the axle member for adjusting an axial position of the head member.

18 Claims, 5 Drawing Sheets

BICYCLE WHEEL SECURING STRUCTURE

CROSS-REFERENCE TO RELATED APPLICATIONS

This application claims priority to Japanese Patent Application No. 2015-155220, filed on Aug. 5, 2015. The entire disclosure of Japanese Patent Application No. 2015-155220 is hereby incorporated herein by reference.

BACKGROUND

Field of the Invention

The present invention generally relates to a bicycle wheel securing structure. In particular, the present invention relates to a bicycle wheel securing structure for detachably securing a wheel to the vehicle body of a bicycle.

Background Information

A bicycle wheel securing structure for detachably securing a wheel to the vehicle body of a bicycle is conventionally known (for example, U.S. Pat. No. 7,537,291). A conventional bicycle wheel securing structure typically comprises a head member, a lever member and an adjusting member. The lever member is pivotally provided to the head member. The adjusting member is configured to adjust a final fixed position of the lever member around an axis.

SUMMARY

One object of the present invention relates to a bicycle wheel securing structure in which adjusting a final fixed position of a lever member around an axis is possible, and is to provide a compact bicycle wheel securing structure.

A bicycle wheel securing structure according to one aspect of the present invention comprises an axle member, a head member, a lever member and an adjusting member. The axle member has a first end portion, a second end portion and a vehicle body engagement portion. The second end portion is positioned on an opposite end from the first end portion. The vehicle body engagement portion is configured to engage a bicycle vehicle body. The head member is disposed on the first end portion. The lever member is turnably provided to the head member to turn between a fixed position and a release position around an axis that intersects the axial direction. The head member is moved relative to the first end portion towards the second end portion as the lever member is being turned from the release position to the fixed position. The adjusting member is provided inside the axle member. The adjusting member is configured to adjust an axial position of the head member.

In this bicycle wheel securing structure, the axial position of the head member can be adjusted by the adjusting member provided inside the axle member. The adjusting member can be disposed in, for example, the hollow portion of the axle member. Even if the adjusting member is provided to the bicycle wheel securing structure, the increasing in length in the axial direction of the bicycle wheel securing structure can be suppressed. As a result, a downsized bicycle wheel securing structure can be provided.

The axle member can comprise a first shaft part and a second shaft part. The first shaft part comprises the first end portion. The first shaft part is non-rotatably provided to the head member, and is attached to the adjusting member. The second shaft part can comprise a second end portion and a vehicle body engagement portion. The second shaft part is non-rotatable with the first shaft part. The second shaft part is hollow and open at both ends. According to this configuration, the adjusting member to which the first shaft part is attached can be disposed on the second shaft part in which both ends are open, and a downsized bicycle wheel securing structure can be provided.

The first shaft part can comprise a first engagement portion and a second engagement portion. The first engagement portion is configured to engage with the adjusting member. The second engagement portion is configured to engage with the first engagement portion, and move the first shaft part in the axial direction by a relative rotation with the first shaft part. According to this configuration, the first shaft part can be moved in the axial direction with simple mechanism such as a screw or a cam.

The first engagement portion can comprise either one of a male threaded portion and a female threaded portion. The second engagement portion can comprise the other of the male threaded portion and the female threaded portion which screws to the one of the male threaded portion and the female threaded portion. According to this configuration, the first shaft part can be moved in the axial direction with a screw easily.

The first engagement portion can be provided on an outer peripheral surface of the first shaft part, and the second engagement portion can be provided on an inner peripheral surface of the adjusting member. According to this configuration, since the outer peripheral surface of the first shaft part engages with the inner peripheral surface of the adjusting member, the diameter of the adjusting member can be increased. Accordingly, in the bicycle wheel securing structure, a structure for turning the adjusting member can be easily formed.

The bicycle wheel securing structure may further comprise a regulating member is configured to regulate movement of the adjusting member in a direction towards the first end portion. According to this configuration, since the movement of the adjusting member in a direction towards the first end portion is regulated by the regulating member, the falling off of the adjusting member from within the second shaft part to a direction towards the first end portion can be inhibited.

The bicycle wheel securing structure can further comprise a biasing member disposed between the head member and the regulating member, for biasing the head member away from the regulating member. According to this configuration, the head member can easily be separated from the vehicle body by turning the lever member from the fixed position to the release position.

The bicycle wheel securing structure can further comprise an operating member that is non-rotatably disposed inside the axle member, and configured to rotate the adjusting member. According to this configuration, the adjusting member can be rotated by the operating member.

The operating member can comprise an operating shaft and an operating part. The operating shaft has a coupling end portion that is coupled to the adjusting member, and an operating end portion that is positioned opposite to the coupling end portion. The operating part is non-rotatably provided on the operating end portion. The operating end portion is rotatably supported to the axle member. According to this configuration, since the operating part is non-rotatably provided on the operating end portion, the user can easily turn the adjusting member using the operating part. Accordingly, the user can carry out an adjusting operation without using tools.

The bicycle wheel securing structure can further comprise a coupling member that non-rotatably couples the operating member and the adjusting member. According to this configuration, the operating member can be inhibited from falling off of the adjusting member by the coupling member.

The coupling member can detachably couple the operating member and the adjusting member. According to this configuration, since the operating member can be attached to the adjusting member only when adjusting is necessary, weight reduction of the bicycle wheel securing structure can be achieved.

The adjusting member can comprise a tool engagement portion for receiving a tool that is inserted to the axle member from the second end portion. According to this configuration, the user can turn the adjusting member using a tool.

The axle member can comprise an abutting portion that regulates the movement of the adjusting member in a direction towards the second end portion. According to this configuration, even if the adjusting member is turned in a direction such that the first shaft part is separated from the adjusting member, since the abutting portion suppresses the movement of the adjusting member towards the second end portion, the first shaft part can be rapidly moved.

The abutting portion can be provided inside the axle member. According to this configuration, the abutting portion can be easily formed by machining, or the like.

The adjusting member can be configured to adjust the axial position of the head member by rotating with respect to the axle member. According to this configuration, the user can adjust the axial position of the head member merely by rotationally operating the adjusting member. Accordingly, adjusting operation becomes easy.

The vehicle body engagement portion can comprise one of a male threaded portion and a female threaded portion which screws to the other of a male threaded portion and a female threaded portion which is provided on the vehicle body.

The bicycle wheel securing structure can further comprise a coupling structure for non-rotatably coupling the first shaft part and the second shaft part. According to this configuration, the first shaft part and the second shaft part can by non-rotatably coupled by the coupling structure.

The coupling structure comprises a first connecting portion that is provided to the regulating member, and a second coupling portion that is provided to the first shaft part so as to non-rotatably engage with the first coupling portion, and the regulating member is non-rotatably coupled to the second shaft part. According to this configuration, the movement of the adjusting member to the first end portion side can be regulated by the regulating member, and the first shaft part and the second shaft part can be non-rotatably coupled.

The vehicle body engagement portion may be provided to the second end portion.

With the above mentioned configurations, a compact bicycle wheel securing structure can be provided.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
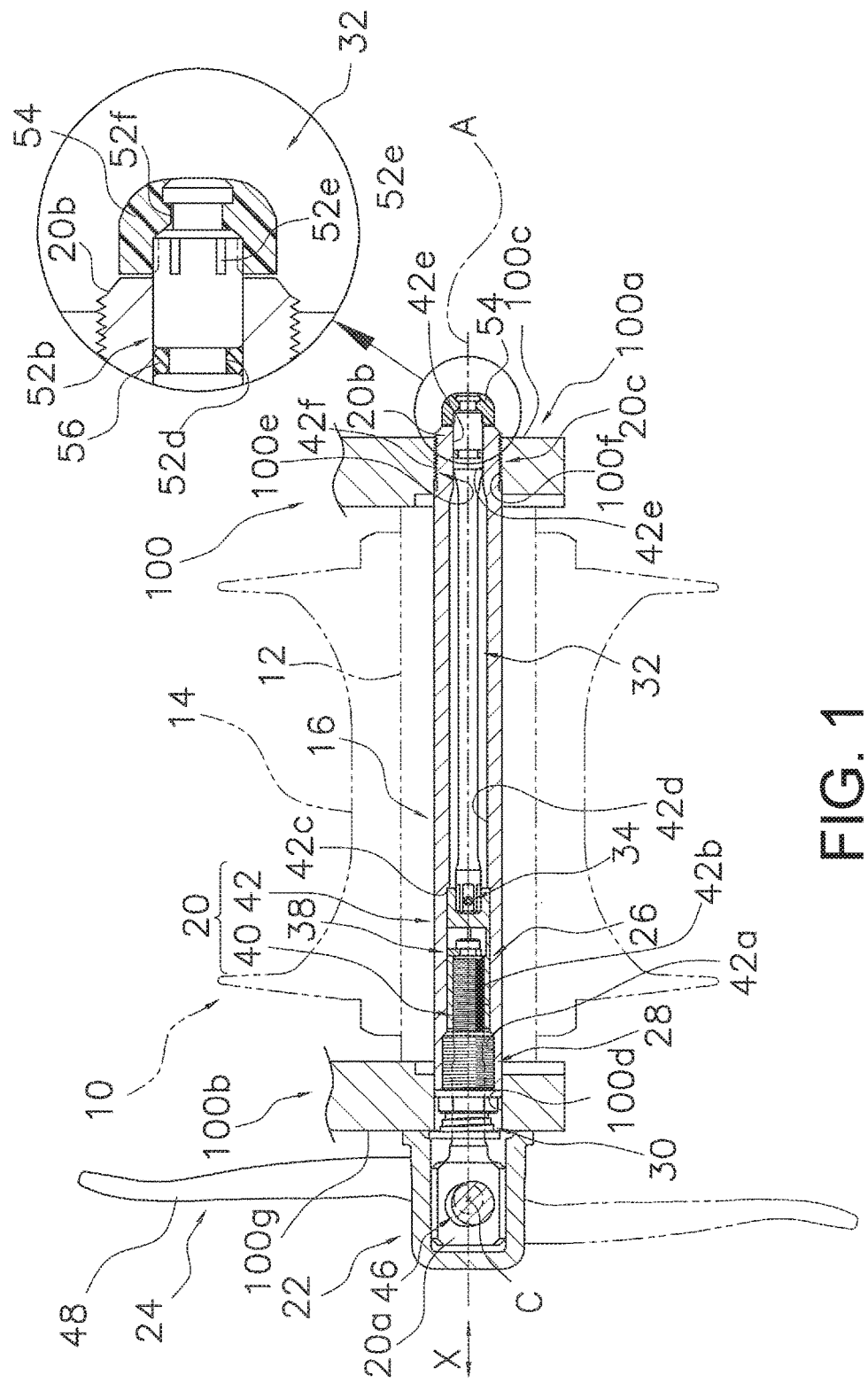
FIG. 1 is a cross-sectional view of a bicycle wheel securing structure according to a first illustrative embodiment.

Referring to FIGS. 1 to 4, a bicycle wheel securing structure 16 according to a first illustrative embodiment will now be explained below. FIG. 1 is a cross-sectional view of the bicycle wheel securing structure 16. The bicycle wheel securing structure 16 secures a bicycle wheel to a bicycle vehicle body 100. Specifically, the bicycle wheel securing structure 16 secures a hub 10 that is part of a bicycle front wheel or a bicycle rear wheel to the vehicle body 100. The vehicle body 100 basically comprises a bicycle frame (not shown) and a front fork (partially shown in cross section in FIG. 1). FIG. 1 is a cross-section diagram of a state in which the wheel securing structure 16 is mounted to the vehicle body 100 of the bicycle as seen from the rear of the bicycle. As used herein in the following explanation, the following directional terms "front", "rear", "left" and "right" as well as any other similar directional terms refer to those directions of a bicycle in a state in which the wheel securing structure 16 is mounted to the bicycle. Accordingly, the term "front" represents the traveling direction of the bicycle, and the term "rear" represents the opposite direction of the traveling direction. The terms "left" and "right" are used to indicate the "right" when referencing from the right side as viewed from the rear of the bicycle, and the "left" when referencing from the left side as viewed from the rear of the bicycle.

The front fork of the vehicle body 100 comprises a wheel securing part 100*a* for securing the hub 10. In the present embodiment, the wheel securing part 100*a* comprises a first front end 100*b* and a second front end 100*c* of the front fork. The second front end 100*c* is spaced apart from the first front end 100*b*. A first through-hole 100*d* is formed at a distal end portion of the first front end 100*b*. A second through-hole 100*e* is formed at a distal end portion of the second front end 100*c*. The first through-hole 100*d* is a circular shaped hole. The second through-hole 100*e* is a circular shaped hole in which a first female threaded portion 100*f* is formed. A nut member can be non-rotatably or rotatably provided to the second front end 100*c*, instead of forming the first female threaded portion 100*f* in the second through-hole 100*e*.

The hub 10 in the first embodiment is a front hub attachable to the front portion of the vehicle body 100. The hub 10 comprises a hub shaft 12 and a hub shell 14. The hub shaft 12 is secured with respect to the first front end 100*b* and the second front end 100*c*. The hub shell 14 is rotatably attached to the hub shaft 12. The hub 10 is attached to the wheel securing part 100*a* by the bicycle wheel securing structure 16. Specifically, the bicycle wheel securing structure 16 detachably attaches the hub shaft 12 to the first front end 100*b* and the second front end 100*c*.

The hub shaft 12 is a hollow shaft member. A first end (FIG. 1, left end) of the hub 12 contacts the first front end 100*b*, and a second end (FIG. 1, right end) contacts the second front end 100*c*.

As shown in FIG. 1, the bicycle wheel securing structure 16 comprises an axle member 20, a head member 22, a lever member 24 and an adjusting member 26. The axle member 20 comprises a first end portion 20a, a second end portion 20b and a vehicle body engagement portion 20c. The second end portion 20b is positioned on the opposite side as the first end portion 20a. The vehicle body engagement portion 20c can be engaged with a bicycle vehicle body 100. At least a portion of the axle member 20 is a hollow portion. The head member 22 is disposed on the first end portion 20a. The lever member 24 is turnably provided on the head member 22 so as to turn around an axis C between a fixed position and a release position. The axis C intersects with an axial direction X of axle member 20. Here, the axis C is perpendicular to the axial direction X. The lever member 24 is configured to press the head member 22 from the first end portion 20a towards the second end portion 20b as the lever member 24 is turned from a second position to a first position. The second position is the release position, while the first position is the fixed position. The adjusting member 26 is provided inside the axle member 20. The adjusting member 26 is configured to adjust the axial position of the head member 22 with respect to the axial direction X. The axle member 20 further comprises a center axis A. The axial direction X is a direction parallel to the center axis A of the axle member 20.

The bicycle wheel securing structure 16 further comprises a regulating member 28. The regulating member 28 is configured to regulate the movement of the adjusting member 26 in a direction towards the first end portion 20a. The regulating member 28 is non-rotatably coupled to a second shaft part 42. The bicycle wheel securing structure 16 further comprises a biasing member 30. The biasing member 30 is disposed between the head member 22 and the regulating member 28. The biasing member 30 is configured to bias the head member 22 away from the regulating member 28. The bicycle wheel securing structure 16 further comprises an operating member 32. The operating member 32 is inserted into the axle member 20. The operating member 32 is non-rotatably coupled to the adjusting member 26, and rotates the adjusting member 26. The bicycle wheel securing structure 16 further comprises a coupling member 34. The coupling member 34 non-rotatably couples the operating member 32 and the adjusting member 26. The bicycle wheel securing structure 16 further comprises a coupling structure 36. The bicycle wheel securing structure 16 further comprises a stopping member 38. In the first embodiment, the axle member 20 includes a first shaft part 40 and a second shaft part 42. The coupling structure 36 non-rotatably couples the first shaft part 40 and the second shaft part 42. The stopping member 38 is configured so as to hold the adjusting member 26 with respect to the first shaft part 40, which will be described below.

Figure 2:
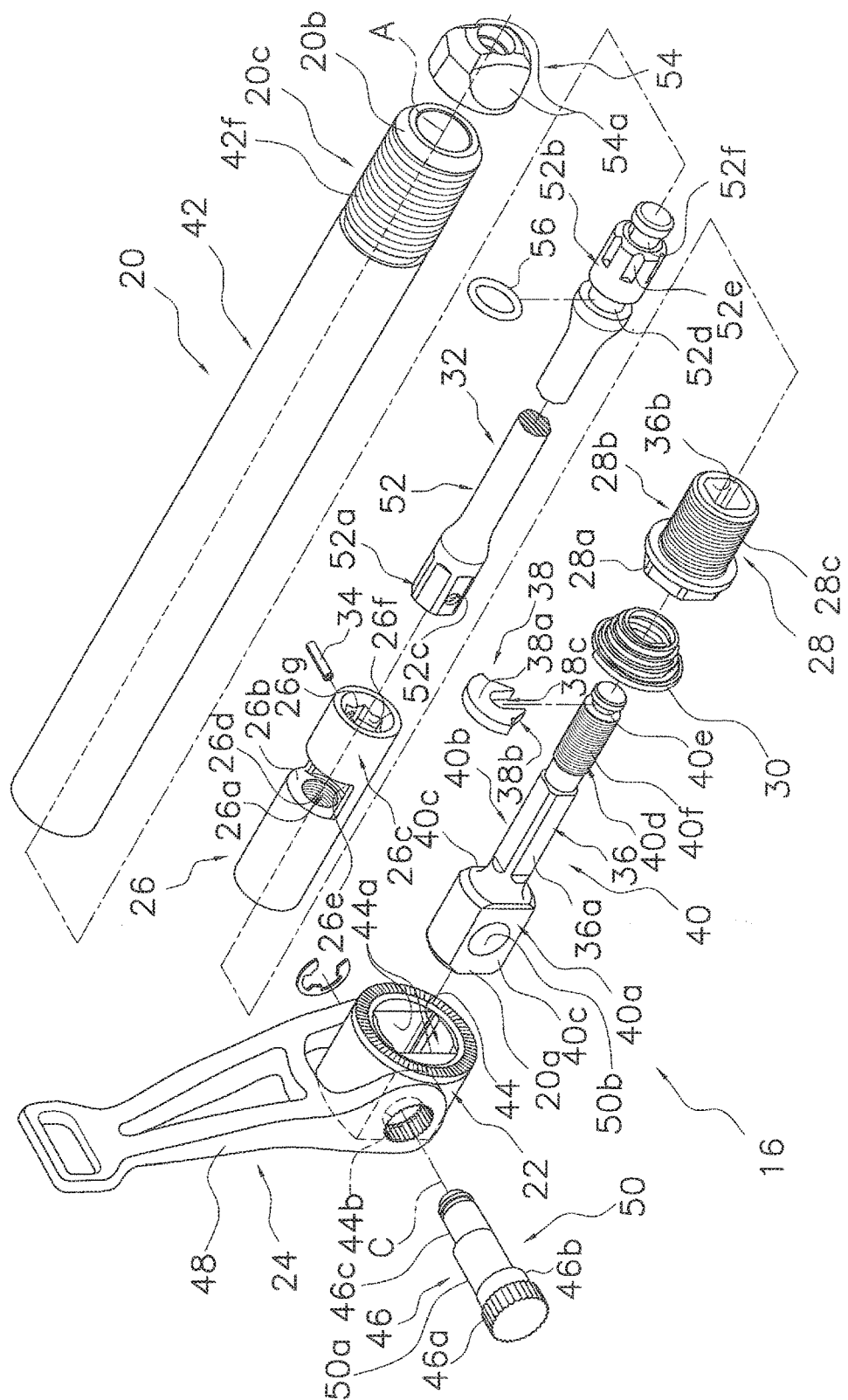
FIG. 2 is an exploded perspective view of the bicycle wheel securing structure illustrated in FIG. 1.
Figure 3:
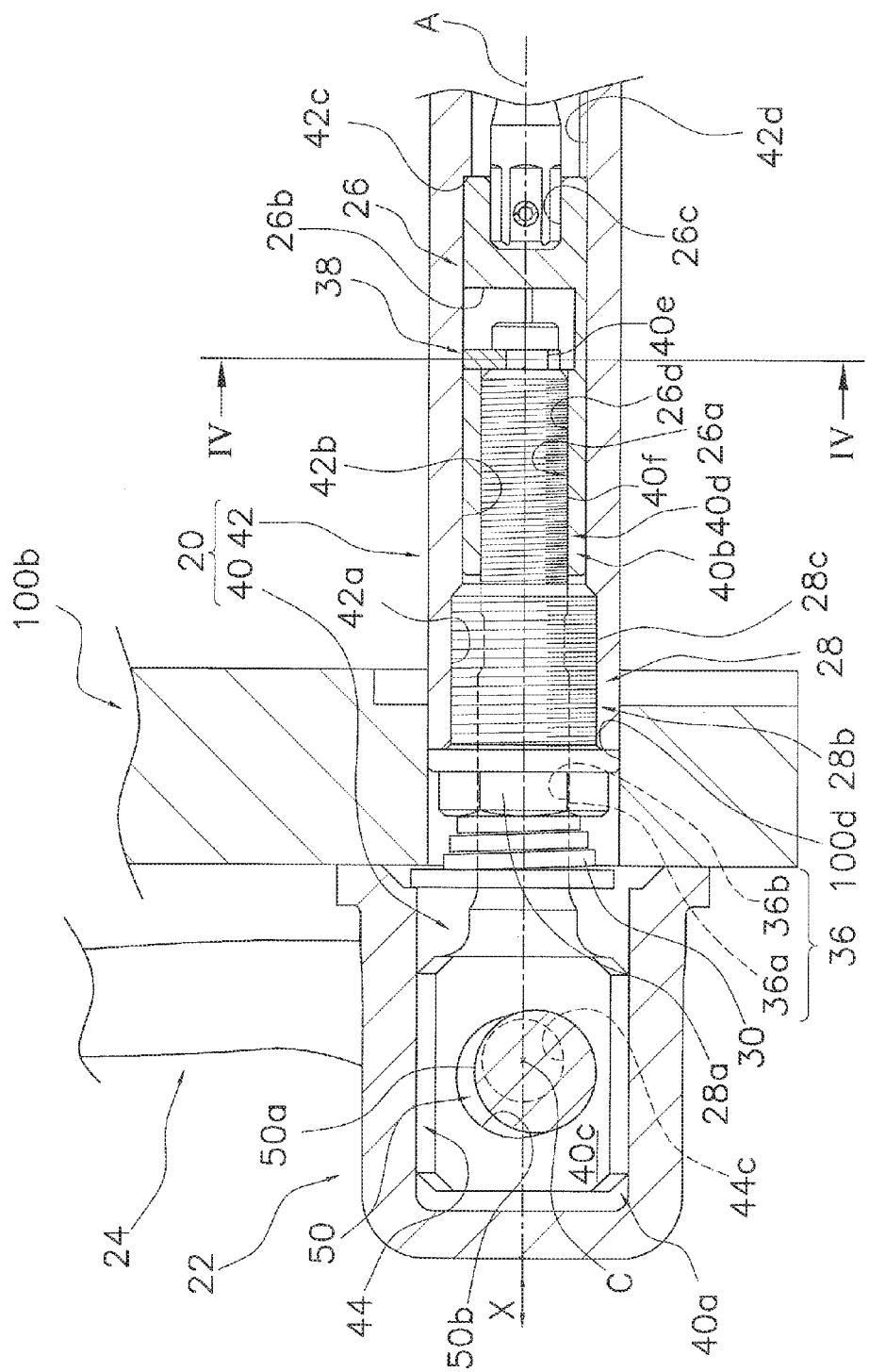
FIG. 3 is an enlarged, partial cross-sectional view of a portion of the lever member side of the bicycle wheel securing structure illustrated in FIGS. 1 and 2.

As shown in FIGS. 2 and 3, the first shaft part 40 of the axle member 20 has a first end portion 20a, while the second shaft part 42 of the axle member 20 has a second end portion 20b and a vehicle body engagement portion 20c. The first shaft part 40 is non-rotatably provided to the head member 22, and attached to the adjusting member 26. The first end portion 20a of the first shaft part 40 is covered by the head member 22. The first shaft part 40 comprises a support portion 40a and a shaft part 40b. The support portion 40a is non-rotatably engaged with the head member 22. The shaft part 40b is integrally formed with the support portion 40a and extends from the support portion 40a toward the second end portion 20b. As will be described below, the second end portion 20b comprises an opening.

The support portion 40a is a columnar member, and comprises a pair of planar surfaces 40c. In the present embodiment, the planar surfaces 40c are formed on the support portion 40a and are orthogonally arranged with respect to the axis C. A cam hole 50b is formed on the support portion 40a. The cam hole 50b extends through the planar surfaces 40c. The connecting portion extending between the support portion 40a and the shaft portion 40b is chamfered. Accordingly, when the user operates the lever member 24 and pulls the first shaft part 40 via the second shaft part 42 towards the side with the lever member 24, a stress concentration is less likely to occur between the support portion 40a and the shaft portion 40b.

The shaft portion 40b comprises a first connecting portion 36a whose transverse cross section is non-circular shaped. The transverse cross section of the first connecting portion 36a is a transverse cross section that is parallel to a surface orthogonal to the axial direction X. In the present embodiment, the shape of the transverse cross section of the first connecting portion 36a is square. The first connecting portion 36a is configured such that the second shaft part 42 is non-rotatably coupled to the first shaft part 40 via the regulating member 28. The shaft portion 40b further comprises a first engagement portion 40d which engages the adjusting member 26. The first engagement portion 40d is formed on the distal end side of the first connecting portion 36a. The first engagement portion 40d engages the adjusting member 26. The first engagement portion 40d comprises either a male threaded portion or a female threaded portion. In the present embodiment, the first engagement portion 40d comprises a first male threaded portion 40f that is formed on the outer peripheral surface of the first shaft part 40. The shaft portion 40b further comprises a ring-shaped groove 40e that is formed at the distal end of the first engagement portion 40d. A stopping member 38 is attached to the ring-shaped groove 40e.

The second shaft part 42 is a hollow tubular member in which both ends are open. The second shaft part 42 comprises the second end portion 20b and the vehicle body engagement portion 20c. The vehicle body engagement portion 20c is provided to the second end portion 20b. The vehicle body engagement portion 20c comprises the other of the male threaded portion or the female threaded portion that screws to one of the male threaded portion or the female threaded portion provided on the vehicle body 100.

In the present embodiment, the vehicle body engagement portion 20c comprises a second male threaded portion 42f that is formed on the side with the second end portion 20b. The second male threaded portion 42f screws into the first female threaded portion 100f of the second through-hole 100e that is formed at the distal end portion of the second front end 100c. The second shaft part 42 further comprises a second female threaded portion 42a. The second female threaded portion 42a screws to the regulating member 28, and secures the regulating member 28 to the second shaft part 42. The second shaft part 42 further comprises a housing portion 42b. The housing portion 42b forms a cylindrical space, and rotatably houses the adjusting member 26. In this way, the adjusting member 26 can freely move in the axial direction X within the cylindrical space defined by the housing portion 42b.

The second shaft part 42 further comprises an abutting portion 42c. As shown in FIG. 3, the abutting portion 42c is provided inside the axle member 20. Specifically, the abutting portion 42c is formed inside the housing portion 42b by reducing the diameter of the cylindrical space of the housing portion 42b at one end as compared to the other end. Thus, the housing portion 42b has a first cylindrical section with a first diameter and a second cylindrical section with a second diameter. The abutting portion 42c is configured so as to regulate the movement of the adjusting member 26 in a direction towards the side with the second end portion 20b. The second shaft part 42 further comprises an operating shaft passage hole 42d. The operating shaft passage hole 42d is formed from the abutting portion 42c to the front side of the second end portion 20b. The operating shaft passage hole 42d is configured such that an operating shaft 52 of the operating member 32 can pass through. The operating shaft 52 will be described below. The second shaft part 42 further comprises an operating shaft support hole 42e. The operating shaft support hole 42e is formed on the inner peripheral surface of the second end portion 20b. The operating shaft support hole 42e is configured so as to rotatably support the operating shaft 52.

As shown in FIGS. 2 and 3, the head member 22 is a bottomed cylindrical cap-shaped member. The head member 22 is configured so as to house the support portion 40a of the first shaft part 40. The head member 22 turnably supports the lever member 24 so that the lever member 24 can be selectively disposed in the first (fixed) position shown by the solid line in FIG. 1, and the second (release) position shown by the chain double-dashed line. The head member 22 comprises a shaft housing portion 44 that houses the support portion 40a of the first shaft part 40. In this way, the support portion 40a is integrally rotatable around the axis C and freely movable in the axial direction X.

As shown in FIG. 2, the shaft housing portion 44 comprises a pair of planar portions 44a that engages with the planar surfaces 40c of the support portion 40a. The transverse cross section of the shaft housing portion 44 is non-circular shaped, wherein the transverse cross section is parallel to a plane that is orthogonal to the X axial direction. A first support hole 44b (refer to FIG. 2) turnably supports a turn shaft 46 of the lever member 24. The turn shaft 46 will be described below, of the lever member 24. A second support hole 44c is formed in the shaft housing portion 44 (refer to FIG. 3). The second support hole 44c has a smaller diameter than the first support hole 44b. The first support hole 44b extends through one of the planar portions 44a, while the second support hole 44c extends through the other of the planar portions 44a. Anti-slip processing is done to an end surface of the head member 22 which contacts an outside surface 100g of the first front end 100b of the vehicle body 100.

As shown in FIG. 2, the lever member 24 comprises a turn shaft 46, a lever main body 48, and a cam mechanism 50. The turn shaft 46 is provided to the head member 22 turnably around the axis C that intersects the axle member 20. The turn shaft 46 comprises a mounting portion 46a, a first supported portion 46b, a cam portion 50a and a second supported portion 46c. The mounting portion 46a, the first supported portion 46b, the cam portion 50a and the second supported portion 46c are arranged, in the listed order, from the proximal end portion to the distal end portion. The first supported portion 46b is slightly smaller in diameter than the mounting portion 46a. The cam portion 50a is eccentric with respect to the first supported portion 46b. The second supported portion 46c is disposed coaxially with the first supported portion 46b. The second supported portion 46c is smaller in diameter than the first supported portion 46b. The turn shaft 46 is turnably supported to the head member 22 at both ends by the first supported portion 46b and the second supported portion 46c. The lever main body 48 is turnable around the axis C to the first position shown by the solid line in FIG. 1, and the second position shown by the chain double-dashed line. The lever main body 48 is non-turnably provided to the turn shaft 46. Specifically, the lever main body 48 is non-turnably mounted to the mounting portion 46a of the turn shaft 46. A C-ring is mounted on the distal end side of the second supported portion 46c for holding the turn shaft 46 with respect to the head member 22. The lever main body 48 extends radially outward with respect to the axis C. The cam mechanism 50 moves the axle member 20 along the axial direction X in accordance the rotation of the lever main body 48. The cam mechanism 50 comprises a cam portion 50a and a cam hole 50b. The cam hole 50b is provided in the support portion 40a of the first shaft part 40. The cam portion 50a is engaged with the cam hole 50b.

The adjusting member 26 adjusts the axial position of the head member 22 by turning with respect to the axle member 20. Specifically, as shown in FIGS. 2 and 3, the adjusting member 26 is a partially cylindrical shaped member that is housed in the housing portion 42b of the second shaft part 42. The outer diameter of the adjusting member 26 is slightly smaller than the inner diameter of the housing portion 42b. The adjusting member 26 comprises a second engagement portion 26a that engages with the first engagement portion 40d. The second engagement portion 26a is configured to move the first shaft part 40 in the axial direction X by a relative rotation with the first shaft part 40. The second engagement portion 26a comprises the other of the male threaded portion or the female threaded portion. In the present embodiment, the second engagement portion 26a comprises a second female threaded portion 26d that is formed on the inner peripheral surface of the adjusting member 26. The adjusting member 26 further comprises a recess 26b that is adjacent one end of the second female threaded portion 26d so that the second female threaded portion 26d opens to the recess 26b.

Figure 4:
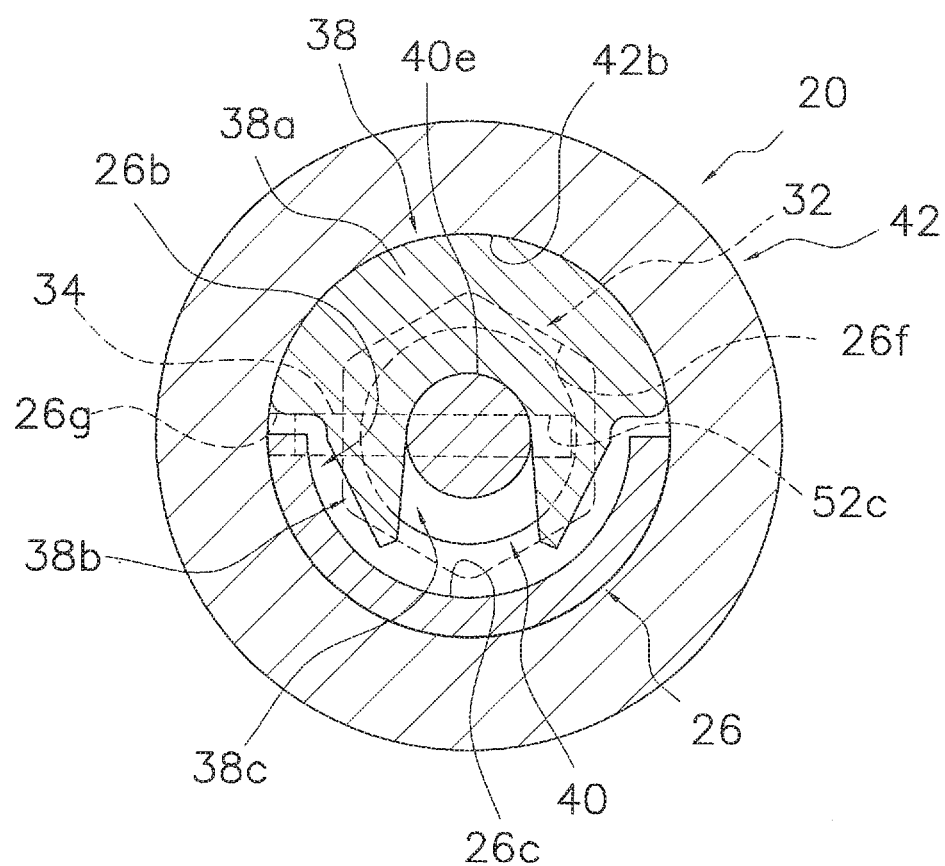
FIG. 4 is a transverse cross-sectional view of the bicycle wheel securing structure illustrated in FIGS. 1 to 3 taken along the section line IV-IV in FIG. 3.

The adjusting member 26 further comprises an operating member coupling portion 26c. The recess 26b is a space for mounting the stopping member 38. As shown in FIG. 4, the recess 26b is formed in a predetermined portion of the adjusting member 26. In particular, a portion of the adjusting member 26 is cut out in a semi-circular shape so as to form a circular arc shape bottom portion 26e. The operating member coupling portion 26c is configured so as to be non-rotatably engaged with the operating member 32. The operating member coupling portion 26c is configured to rotationally operate the adjusting member 26 using the operating member 32. The operating member coupling portion 26c comprises a coupling recess 26f and a first coupling hole 26g. The coupling recess 26f is formed on the side end surface of the adjusting member 26 with the second end portion 20b. The coupling member 34 is mounted to the first coupling hole 26g. In the present embodiment, the coupling recess 26f is non-circular.

The regulating member 28 is secured to the second shaft part 42 at the side with the first end portion 20a adjacent to the adjusting member 26. The regulating member 28 is configured to regulate the movement of the adjusting member 26 in the axial direction X towards the first end portion 20a. The regulating member 28 comprises a large-diameter flange portion 28a, a shaft portion 28b, and a second connecting portion 36b. The flange portion 28a is configured to be turned using a tool. In the present embodiment, the shape of the flange portion 28a is hexagonal. The flange portion 28a abuts the end surface of the second shaft part 42 that faces the first end portion 20a. The shaft portion 28b comprises a third male threaded portion 28c on the outer peripheral surface. The third male threaded portion 28c screws into the second female screw hole 42a of the second shaft part 42. The second connecting portion 36b is a hole that is configured to slidably receive the first connecting portion 36a. In this way, once the first connecting portion 36a is disposed in the second connecting portion 36b, the regulating member 28 is non-rotatably coupled to the first shaft part 40. In the present embodiment, the cross section of the second connecting portion 36b is non-circular, and is, specifically, rectangular. In the present embodiment, the regulating member 28 is secured to the second shaft part 42 by an adhesive. Therefore, the regulating member 28 is non-rotatably coupled to the second shaft part 42. A coupling structure 36 that non-rotatably couples the first shaft part 40 and the second shaft part 42 is formed of the first connecting portion 36a and the second connecting portion 36b.

The biasing member 30 is, for example, a volute spring, disposed in a compressed state between the head member 22 and the flange portion 28a of the regulating member 28. The biasing member 30 aids in preventing rattling of the head member 22 and the axle member 20. The biasing member 30 is not limited to a volute spring, and may be a disc spring, a coil spring, or an elastic body such as rubber.

In addition to the operating shaft 52, the operating member 32 further comprises an operating part 54. The operating shaft 52 comprises a coupling end portion 52a and an operating end portion 52b. The coupling end portion 52a is coupled to the adjusting member 26 The coupling end portion 52a is configured so as to be non-rotatably engaged with the coupling recess 26f. The cross section of the coupling recess 26f is non-circular, and in the present embodiment, is hexagonal. A second coupling hole 52c is formed in the coupling end portion 52a. The operating member 32 and the adjusting member 26 are non-rotatably coupled by the coupling member 34 being inserted into the first coupling hole 26g and the second coupling hole 52c. Accordingly, the operating member 32 can be held with respect to the adjusting member 26. The coupling member 34 is a larger-diameter member than the first coupling hole 26g and the second coupling hole 52c. For example, the coupling member 34 is a spring pin. With this configuration, since the coupling member 34 frictionally engages with the first coupling hole 26g and the second coupling hole 52c, the coupling member 34 becomes less likely to come out of the first coupling hole 26g and the second coupling hole 52c.

The operating end portion 52b is positioned on the opposite side of the coupling end portion 52a. Specifically, the operating end portion 52b is positioned on the opposite side of the coupling end portion 52a in the axial direction X. The operating end portion 52b protrudes from the second end portion 20b, and is rotatably supported at the axle member 20. Specifically, the operating end portion 52b protrudes from the second end portion 20b, and is rotatably supported at the operating shaft support hole 42e of the second shaft part 42. A ring-shaped first mounting groove 52d, a knurl 52e, and a ring-shaped second mounting groove 52f are formed, in the listed order, towards the shaft end, on the operating end portion 52b. The first mounting groove 52d is formed on nearer to the first end portion 20a than the second end portion 20b. The knurl 52e and the second mounting groove 52f are formed at a location of the coupling member 34 that protrudes out from the second end portion 20b of the axle member 20. A ring-shaped elastic body 56 is mounted on the first mounting groove 52d. The ring-shaped elastic body 56 is, for example, an O-ring. The ring-shaped elastic body 56 is provided to adjust the operating force of the operating member 32. The ring-shaped elastic body 56 is provided so that the adjusted rotational position does not move. The operating part 54 is non-rotatably provided to the operating end portion 52b. Specifically, the operating part 54 is non-rotatably coupled to the knurl 52e of the operating end portion 52b. The second mounting groove 52f is configured so as to elastically engage the operating part 54 and stop the operating part 54. The operating part 54, for example, is a synthetic resin made member having elasticity. The operating part 54 is configured so that when the operating part 54 is rotated by the operator, the operating shaft 52 is rotated. The operating part 54 comprises a pair of pinch portions 54a that are slightly recessed. The pinch portions 54a are disposed so as to face away from each other in a direction orthogonal to the center axis A. By using the pinch portions 54a, the operating performance of the operating part 54 is improved, and the user can visually recognize the rotational position of the operating part 54.

The stopping member 38, as described above, holds the adjusting member 26 with respect to the first shaft part 40. As shown in FIG. 4, the stopping member 38 comprises a semi-circular first stopping portion 38a and a second stopping portion 38b. The semi-circular first stopping portion 38a engages the recess 26b of the adjusting member 26. The second stopping portion 38b has a slit 38c, which engages the ring-shaped groove 40e. The first stopping portion 38a contacts the recess 26b of the adjusting member 26, and fits in the inner peripheral surface of the housing portion 42b. The first stopping portion 38a is slightly larger in outer diameter than the adjusting member 26. The two distal end portions of the second stopping portion 38b form the slit 38c. The two distal end portions of the second stopping portion 38b are configured so that the spacing therebetween is gradually increased. Accordingly, the mounting performance of the stopping member 38 is improved.

When assembling the bicycle wheel securing structure 16, the first shaft part 40 is coupled to the adjusting member 26 in a held state by the stopping member 38, in advance. The operating shaft 52 is coupled to the adjusting member 26 by the coupling member 34. During assembly, an assembled body comprising the first shaft portion 40, the adjusting member 26, and the operating shaft 52 is inserted to the second shaft part 42 from the side of the first end portion 20a. Then, the operating part 54 is non-rotatably mounted on the operating shaft 52 protruding from the second end portion 20b.

In the bicycle wheel securing structure 16 configured in this way, when the user attaches the hub 10 to the wheel securing part 100a for the first time, the user turns the operating part 54 in a direction in which the screw is loosened, and moves the first shaft part 40 leftward in the axial direction X with respect to the adjusting member 26. The user positions the hub 10 between the first front end 100b and the second front end 100c, and inserts the axle member 20 from the first through-hole 100d towards the second through-hole 100e via the hub shaft 12.

The user rotates the lever member 24 in a direction in which the screw is tightened, and screws the second male threaded portion 42f of the vehicle body engagement portion 20c of the second end portion 20b of the axle member 20 into the first female threaded portion 100f of the second through-hole 100e. The head member 22 approaches the outside surface 100g of the first front end 100b. The user disposes the lever main body 48 in the second position and turns the lever main body 48. At this time, the user positions the lever main body 48 in a rotational position such that the lever main body 48 runs along the first front end 100b, when the lever main body 48 is disposed in the first position.

The user turns the operating part 54 in a direction in which the screw is tightened. As a result of turning the operating part 54 in a tightening direction, the head member 22 contacts the outside surface 100g of the first front end 100b, and the lever main body 48 turns from the second position to the first position. With this configuration, the securing of the wheel is complete. According to the present embodiment, when mounting the wheel next time and onward, the user is not required to carry out the position adjustment of the adjusting member 26 using the operating part 54. Since the adjusting member 26 is provided inside the second shaft part 42, the length of the bicycle wheel securing structure 16 in the axial direction is not increased. Therefore, the bicycle wheel securing structure 16 can be provided as a more compact structure.

Other Embodiments

One embodiment of the present invention was described above, but the present invention is not limited to the above-described embodiment, and various modifications can be made without departing from the scope of the invention. The various embodiments and modified examples described in the present Specification can be freely combined according to necessity.

Figure 5:
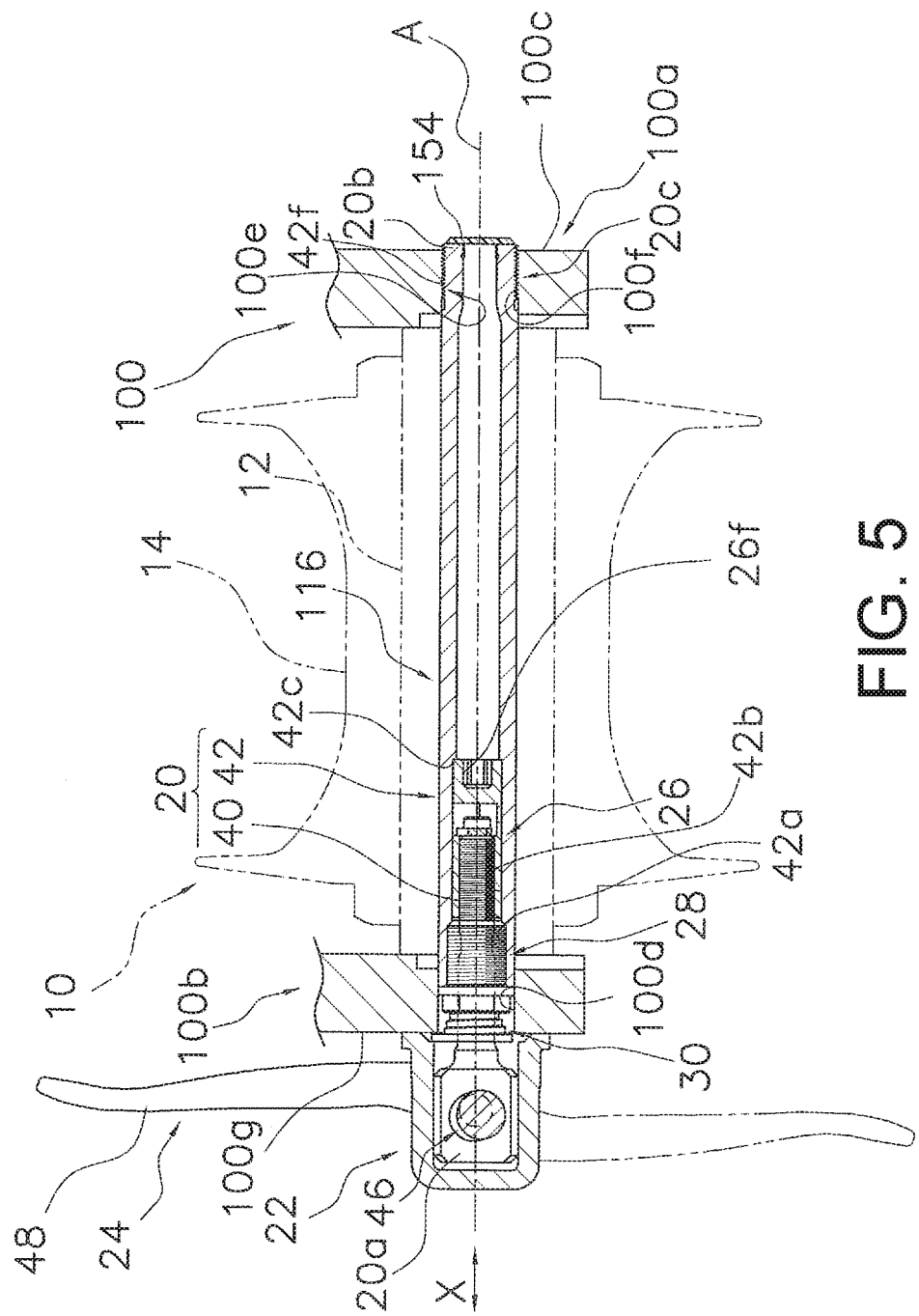
FIG. 5 is a cross-sectional view of a bicycle wheel securing structure according to a second illustrative embodiment.

(a) In the above-described embodiment, the bicycle wheel securing structure 16 comprises the operating member 32, but the present invention is not limited thereto. FIG. 5 is a cross-sectional view of a bicycle wheel securing structure 116 according to a modified example of one embodiment of the present invention. As shown in FIG. 5, the bicycle wheel securing structure 116 does not comprise the operating member 32. In this case, for example, a rod-shaped tool such as a hex wrench is used for the rotating operation of the adjusting member 26, instead of the operating member 32. The adjusting member 26 comprises a tool engagement portion 126f for receiving a tool which is inserted to the second shaft part 42 of the axle member 20 from the opening of the second end portion 20b, instead of the coupling recess 26f. When a tool is not inserted, in order to prevent water or foreign substance from flowing into the second shaft part 42, the opening of the second end portion 20b can be blocked by attaching a detachable cap member 154 to the opening of the second end portion 20b.

(b) In the above-described embodiment, the bicycle wheel securing structure 16 in which the second end portion 20b of the axle member 20 screws to the screw provided on the vehicle body is disclosed, but the present invention is not limited thereto. That is, the present invention can also be applied to a bicycle wheel securing structure which is secured to a vehicle body by the second end portion 20b and a member such as a nut being screwed.

(c) In the above-described embodiment, the coupling recess 26f is hexagonal-shaped so that a tool such as a hex wrench can be used, but the present invention is not limited thereto. For example, the coupling recess 26f can be of a non-circular shape such as a square, or a slot to which a screw driver engages.

(d) In the above-described embodiment, the adjusting member 26 and the first shaft part 40 are engaged using a screw, but the present invention is not limited thereto. For example, the adjusting member 26 and the first shaft part 40 can be engaged using a cam mechanism.

(e) In the above-described embodiment, the operating member 32 and the adjusting member 26 were coupled by the coupling member 34 so as not to come apart, but the present invention is not limited thereto. That is, the operating member 32 and the adjusting member 26 can be detachably coupled. Specifically, the coupling member 34 can be an elastic body such as an O-ring, which detachably couples the operating member 32 and the adjusting member 26 by frictional engagement. The coupling member 34 can comprise a ball or a pin member biased with a spring, or the like, provided to either one of the adjusting member 26 or the operating member 32, and a recess that is engaged with the ball or the pin provided to the other of the adjusting member 26 or the operating member 32.

(f) In the above-described embodiment, the wheel securing part 100a separately comprises the first front end 100b and the second front end 100c of the front fork, but the present invention is not limited thereto. That is, the wheel securing part 100a can separately comprise a first rear end and a second rear end of the frame. In this case, a first through-hole and a second through-hole may be separately formed on the first rear end and the second rear end. The first through-hole is a normal circular shaped hole, and the second through-hole comprises a first female threaded portion. The second through-hole can be a nut member non-rotatably or rotatably provided to the second front end, instead of the first female threaded portion. In this case, the hub 10 is a rear hub mountable to a rear portion of the vehicle body 100.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

Also it will be understood that although the terms "first" and "second" may be used herein to describe various components these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A bicycle wheel securing structure comprising:
an axle member having a first end portion, a second end portion and a vehicle body engagement portion, the second end portion being positioned on an opposite end from the first end portion, and the vehicle body engagement portion being configured to engage a bicycle vehicle body;
a head member disposed on the first end portion;
a lever member turnably provided to the head member to turn between a fixed position and a release position around an axis that intersects an axial direction of the axle member, the head member being moved relative to the first end portion towards the second end portion as the lever member is being turned from the release position to the fixed position;
an adjusting member provided inside the axle member, the adjusting member being configured to adjust an axial position of the head member; and
an operating member non-rotatably disposed inside the axle member, and configured to rotate the adjusting member.

2. The bicycle wheel securing structure as recited in claim 1, wherein
the axle member comprises a first shaft part and a second shaft part,
the first shaft part having the first end portion, the first shaft part being provided non-rotatably to the head member and attached to the adjusting member, and
the second shaft part comprises the second end portion and the vehicle body engagement portion, the second shaft part being non-rotatable with the first shaft part, and the second shaft part being hollow and open at both ends.

3. The bicycle wheel securing structure as recited in claim 1, wherein
the operating member comprises an operating shaft and an operating part, the operating shaft having a coupling end portion coupled to the adjusting member and an operating end portion positioned opposite to the coupling end portion, and
the operating part being non-rotatably provided to the operating end portion,
the operating end portion being rotatably supported to the axle member.

4. The bicycle wheel securing structure as recited in claim 1, further comprising:
a coupling member that non-rotatably couples the operating member and the adjusting member.

5. The bicycle wheel securing structure as recited in claim 4, wherein
the coupling member detachably couples the operating member and the adjusting member.

6. The bicycle wheel securing structure as recited in claim 1, wherein
the adjusting member is configured to adjust the axial position of the head member by rotating with respect to the axle member.

7. The bicycle wheel securing structure as recited in claim 1, wherein
the vehicle body engagement portion comprises one of a male threaded portion and a female threaded portion which screws to the other of a male threaded portion and a female threaded portion which is provided on the vehicle body.

8. The bicycle wheel securing structure as recited in claim 1, wherein
the vehicle body engagement portion is provided to the second end portion.

9. A bicycle wheel securing structure comprising:
an axle member having a first shaft part including a first end portion and a second shaft part including a second end portion and a vehicle body engagement portion, the second end portion being positioned on an opposite end from the first end portion, and the vehicle body engagement portion of the second shaft part being configured to engage a bicycle vehicle body;
a head member disposed on the first end portion;
a lever member turnably provided to the head member to turn between a fixed position and a release position around an axis that intersects an axial direction of the axle member, the head member being moved relative to the first end portion towards the second end portion as the lever member is being turned from the release position to the fixed position; and
an adjusting member provided inside the axle member, the adjusting member being configured to adjust an axial position of the head member,
the first shaft part being provided non-rotatably to the head member and attached to the adjusting member, the first shaft part further including a first engagement portion and a second engagement portion, the first engagement portion being configured to engage the adjusting member, and the second engagement portion being configured to engage the first engagement portion and move the first shaft part in the axial direction by a relative rotation with the first shaft part, and
the second shaft part being non-rotatable with the first shaft part, and the second shaft part being hollow and open at both ends.

10. The bicycle wheel securing structure as recited in claim 9, wherein
the first engagement portion comprises one of a male threaded portion and a female threaded portion, and
the second engagement portion comprises the other of the male threaded portion and the female threaded portion which screws into the one of the male threaded portion and the female threaded portion.

11. The bicycle wheel securing structure as recited in claim 9, wherein
the first engagement portion is provided on an outer peripheral surface of the first shaft part, and
the second engagement portion is provided on an inner peripheral surface of the adjusting member.

12. A bicycle wheel securing structure comprising:
an axle member having a first shaft part including a first end portion and a second shaft part including a second end portion and a vehicle body engagement portion, the second end portion being positioned on an opposite end from the first end portion, and the vehicle body engagement portion of the second shaft part being configured to engage a bicycle vehicle body;
a head member disposed on the first end portion;
a lever member turnably provided to the head member to turn between a fixed position and a release position around an axis that intersects an axial direction of the axle member, the head member being moved relative to the first end portion towards the second end portion as the lever member is being turned from the release position to the fixed position;
an adjusting member provided inside the axle member, the adjusting member being configured to adjust an axial position of the head member; and
a regulating member configured to regulating movement of the adjusting member in a direction towards the first end portion,
the first shaft part being provided non-rotatably to the head member and attached to the adjusting member, and
the second shaft part being non-rotatable with the first shaft part, and the second shaft part being hollow and open at both ends.

13. The bicycle wheel securing structure as recited in claim 12, further comprising
a biasing member disposed between the head member and the regulating member, which biases the head member away from the regulating member.

14. The bicycle wheel securing structure as recited in claim 12, further comprising:
a coupling structure that non-rotatably couples the first shaft part and the second shaft part.

15. The bicycle wheel securing structure as recited in claim 14, wherein
the coupling structure comprises a first connecting portion that is provided to the regulating member, and a second connecting portion that is provided to the first shaft part so as to non-rotatably engage with the first connecting portion, and the regulating member is non-rotatably coupled to the second shaft part.

16. A bicycle wheel securing structure comprising:
an axle member having a first end portion, a second end portion and a vehicle body engagement portion, the second end portion being positioned on an opposite end from the first end portion, and the vehicle body engagement portion being configured to engage a bicycle vehicle body;
a head member disposed on the first end portion;
a lever member turnably provided to the head member to turn between a fixed position and a release position around an axis that intersects an axial direction of the axle member, the head member being moved relative to the first end portion towards the second end portion as the lever member is being turned from the release position to the fixed position; and
an adjusting member provided inside the axle member, the adjusting member being configured to adjust an axial position of the head member, the adjusting member including a tool engagement portion for receiving a tool that is inserted to the axle member from the second end portion.

17. A bicycle wheel securing structure comprising:
an axle member having a first end portion, a second end portion and a vehicle body engagement portion, the second end portion being positioned on an opposite end from the first end portion, and the vehicle body engagement portion being configured to engage a bicycle vehicle body;
a head member disposed on the first end portion;
a lever member turnably provided to the head member to turn between a fixed position and a release position around an axis that intersects an axial direction of the axle member, the head member being moved relative to the first end portion towards the second end portion as the lever member is being turned from the release position to the fixed position; and
an adjusting member provided inside the axle member, the adjusting member being configured to adjust an axial position of the head member,
the axle member including an abutting portion that regulates movement of the adjusting member in a direction towards the second end portion.

18. The bicycle wheel securing structure as recited in claim 17, wherein
the abutting portion is provided inside the axle member.

* * * * *